UNITED STATES PATENT OFFICE.

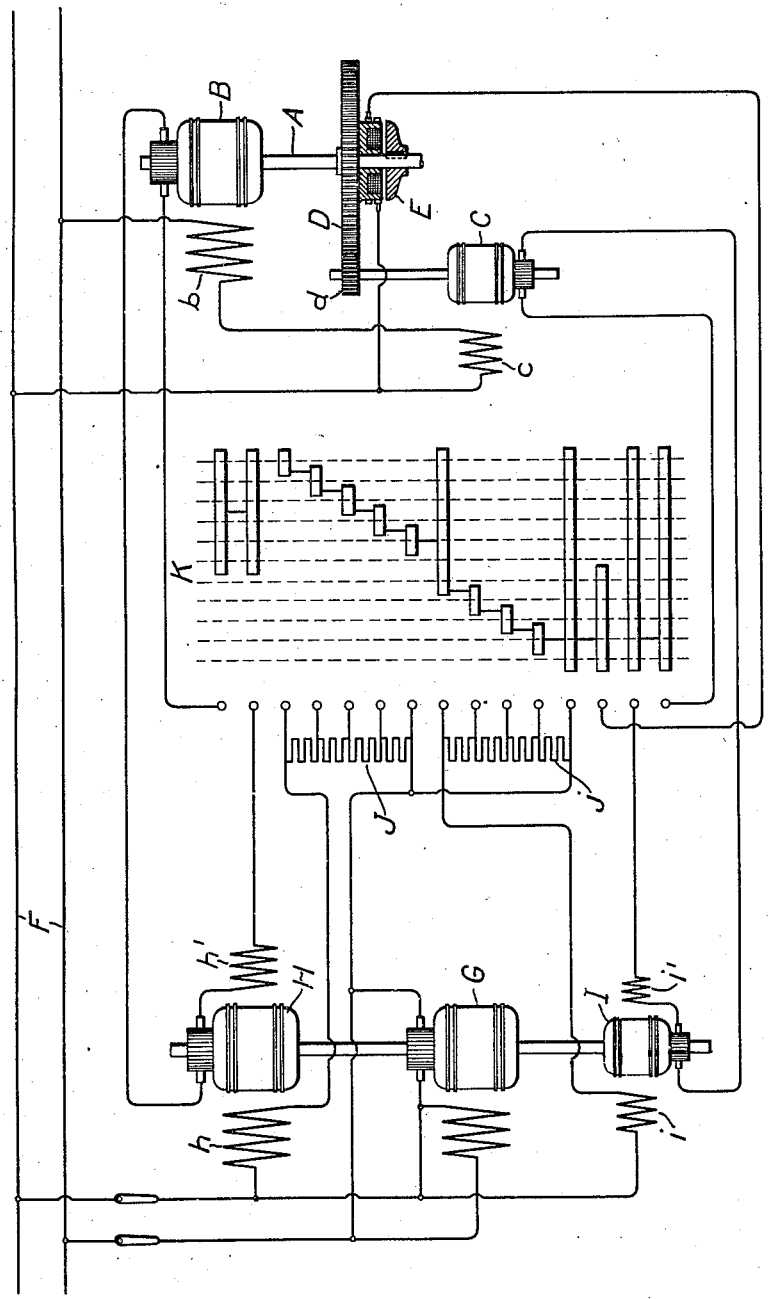

WILBUR L. MERRILL, OF SCHENECTADY, NEW YORK, ASSIGNOR TO GENERAL ELECTRIC COMPANY, A CORPORATION OF NEW YORK.

MOTOR CONTROL.

No. 853,711.    Specification of Letters Patent.    Patented May 14, 1907.

Application filed October 15, 1906. Serial No. 338,896.

*To all whom it may concern:*

Be it known that I, WILBUR L. MERRILL, a citizen of the United States, residing at Schenectady, county of Schenectady, State of New York, have invented certain new and useful Improvements in Motor Control, of which the following is a specification.

My invention relates to the control of electric motors for driving loads over wide ranges of speed.

For certain kinds of motor-drives, in which wide ranges of speed are required, such as in the operation of gun turrets and printing presses, it has been proposed heretofore to employ two motors, the smaller of which is geared to the load through speed-reducing gearing so as to start and drive it at low speed, while the larger motor is geared so as to drive the load at high speed. The smaller motor is ordinarily provided with a clutch so that it can be disconnected from the load when the larger motor is operating. The method of speed control that has usually been employed heretofore for such a combination is the resistance method, but in cases where a constant speed is desired for any given position of the controlling switch with varying load, resistance control is not suitable, since the voltage drop in the resistance varies with varying load on the motor. In such cases a voltage control is preferable, but since the smaller motor must be cut out at its highest speed, and the larger motor simultaneously cut in at its lowest speed, the usual methods of voltage control make a quick and smooth transition from one motor to the other difficult to obtain.

My invention broadly consists in employing for the purpose of this control separate sources of variable voltage for the two motors, and therefore I am enabled to make a quick and smooth transfer from the smaller motor at maximum voltage to the larger motor at minimum voltage.

More specifically stated, I employ two generators of different capacities, corresponding to the two motors, which may be driven from a constant potential source of supply by a constant-speed motor, and provide a switch for connecting the generators to the two motors respectively and for varying the voltages delivered by the generators. At starting the smaller generator is connected with a weak field and consequently low-voltage to the smaller motor. The field of the smaller generator is then gradually increased to maximum value. At this point the larger generator is connected with a weak field to the larger motor. The gearing between the two generators and the load is arranged to give a load-speed with the smaller motor operating at maximum voltage approximately the same as with the larger motor operating at minimum voltage. After the larger motor has been connected to its generator, the smaller motor is mechanically disconnected from the load, and the voltage of the larger generator is then gradually increased, further to increase the load-speed.

My invention will best be understood by reference to the accompanying drawing, which shows diagrammatically a control system arranged in accordance with my invention.

In the drawing, A represents a shaft which is geared or otherwise connected to the load which is to be driven.

B represents the armature of the larger motor, which is connected directly to the shaft A. $b$ represents the field of this motor.

C represents the armature of the smaller motor, which is connected to the shaft A through the low-speed gearing formed by the pinion $d$ and gear D.

$c$ represents the motor-field.

E is a magnetic clutch for connecting and disconnecting the shaft A and the gear D.

F represents supply-conductors connected to a constant potential source.

G is a shunt-wound motor connected to and supplied by the constant potential conductors F.

H and I represent the armatures of a large and a small generator, which are driven by the motor G, the capacities of which correspond respectively to the capacities of the motors B and C. $h$ and $i$ represent the shunt-fields of the two generators, which may also be provided with series fields $h^1$ and $i^1$, if desired, in order to maintain the voltage approximately constant under varying load with a given strength of shunt field.

J and $j$ represent two field-resistances which are connected in series with the fields $h$ and $i$, respectively.

K represents a controlling switch.

The operation of the system is as follows: When the switch K is moved into its first position, generator-armature C is connected to motor-armature I, while clutch E is connected across the line-wires F. The circuit of the shunt-field $i$ is also closed with all of the resistance $j$ in circuit. The minimum voltage of the smaller generator is consequently supplied to the armature C, and this armature drives the shaft A at its minimum speed. As the controller K is moved through its other positions the resistance $j$ is short-circuited step-by-step, until finally it is all cut out of circuit. The smaller generator is then delivering its maximum voltage to the smaller motor. At this point the circuit of the larger motor is closed. The circuit of the field $h$ has already been closed with all of resistance J in series. Consequently, the generator-armature H supplies its minimum voltage to the larger motor. At the same time the circuit of the magnetic clutch E is broken. The gearing between the two motors and the load is so arranged that the same load-speed is obtained with the larger motor operating at minimum voltage as with the smaller motor operating at maximum voltage. Consequently, an even transition from one motor to the other is obtained. Further movement of the controlling switch cuts out sections of resistance J, increasing the voltage delivered to the large motor, so as further to increase the speed of the shaft A. The small motor may continue to run idle at full speed, so as to be ready to take up the load on the return movement of the controlling switch K.

I do not desire to limit myself to the particular construction and arrangement of parts here shown, but aim in the appended claims to cover all modifications which are within the scope of my invention.

What I claim as new and desire to secure by Letters Patent of the United States, is,—

1. In combination with a load to be driven, two electric motors of different capacities, mechanical connections between the load and both motors whereby the load may be driven by either motor but at different speeds, and a separate source of variable voltage for each motor.

2. In combination with a load to be driven, two electric motors of different capacities, low-speed gearing between the smaller motor and the load, high-speed gearing between the larger motor and the load, and a separate source of variable voltage for each motor.

3. In combination with a load to be driven, two electric motors of different capacities, low-speed gearing between the smaller motor and the load, high-speed gearing between the larger motor and the load, and a separate source of variable voltage for each motor, said gearing being arranged to give approximately the same load-speed with the larger motor operating at its minimum voltage and with the smaller motor operating at its maximum voltage.

4. In combination with a load to be driven, two electric motors of different capacities, low-speed gearing between the smaller motor and the load, high-speed gearing between the larger motor and the load, a separate source of variable voltage for each motor, and a single switch controlling the voltage supplied to both motors.

5. In combination with a load to be driven, two electric motors of different capacities, low-speed gearing between the smaller motor and the load, high-speed gearing between the larger motor and the load, a separate source of variable voltage for each motor, and a controlling switch arranged to control the voltage supplied to each motor and to transfer the load from the smaller motor operating at maximum voltage to the larger motor operating at minimum voltage, the gearing being arranged to give approximately the same load-speed before and after the transfer.

6. In combination with a load to be driven, two electric motors of different capacities, low-speed gearing between the smaller motor and the load, high-speed gearing between the larger motor and the load, a separate source of variable voltage for each motor, and means for operating said motors alternately to drive the load.

7. In combination with a load to be driven, two electric motors of different capacities, low-speed gearing between the smaller motor and the load, high-speed gearing between the larger motor and the load, a separate source of variable voltage for each motor, and means for alternately breaking the circuit of the larger motor and mechanically disconnecting the smaller motor from the load.

8. In combination with a load to be driven, two electric motors of different capacities, low-speed gearing between the smaller motor and the load, high-speed gearing between the larger motor and the load, and a separate source of variable voltage for each motor, a magnetic clutch in the gearing between the smaller motor and the load, and a controlling switch for alternately breaking the circuit of the larger motor and of the clutch.

9. In combination with a load to be driven, two electric motors of different capacities, mechanical connections between the load and both motors, whereby the load may be driven by either motor but at different speeds, a constant potential supply circuit, and means for deriving from said circuit two independent variable voltages for the respective motors.

10. In combination with a load to be driven, two electric motors of different capacities, low-speed gearing between the smaller motor and the load, high-speed gearing between the larger motor and the load, a constant potential supply circuit, and means for deriving from said circuit two independent variable voltages for the respective motors.

11. In combination with a load to be driven, two electric motors of different capacities, low-speed gearing between the smaller motor and the load, high-speed gearing between the larger motor and the load, a constant potential supply circuit, and means for deriving from said circuit two independent variable voltages for the respective motors, the gearing between the load and the motors being arranged to give approximately the same load-speed with the larger motor operating at its minimum voltage and with the smaller motor operating at its maximum voltage.

12. In combination with a load to be driven, two electric motors of different capacities, low-speed gearing between the smaller motor and the load, high-speed gearing between the larger motor and the load, a constant potential supply circuit, means for deriving from said circuit two independent variable voltages for the respective motors, and a single switch controlling the voltage supply to both motors.

13. In combination with a load to be driven, two electric motors of different capacities, low-speed gearing between the smaller motor and the load, high-speed gearing between the larger motor and the load, a constant potential supply circuit, means for deriving from said circuit two independent variable voltages for the respective motors, and means for operating said motors alternately to drive the load.

14. In combination with a load to be driven, two electric motors of different capacities, mechanical connections between the load and both motors, whereby the load may be driven by either motor but at different speeds, a constant potential supply circuit, an electric motor connected thereto, two generators of different capacities driven thereby, means for connecting the two generators to the two load-driving motors respectively, and means for controlling the voltage delivered by each of said generators.

15. In combination with a load to be driven, two electric motors of different capacities, low-speed gearing between the smaller motor and the load, high-speed gearing between the larger motor and the load, a constant potential supply circuit, an electric motor connected thereto, two generators of different capacities driven by said motor, and a switch arranged to connect the two generators to the two motors respectively and to vary the voltage delivered by said generators, said gearing between the load and the motors being arranged to give approximately the same load-speed with the larger motor operating at minimum voltage and with the smaller motor operating at maximum voltage.

16. In combination with a load to be driven, two electric motors of different capacities, low-speed gearing between the smaller motor and the load, high-speed gearing between the larger motor and the load, a constant potential supply circuit, an electric motor connected thereto, two generators of different capacities driven by said motor, a switch arranged to connect the two generators to the two load-driving motors respectively and successively and to vary the voltage delivered by said generators, and means for mechanically disconnecting the smaller motor from the load when the larger motor is electrically connected to its generator.

17. In combination with a load to be driven, two electric motors of different capacities, mechanical connections between the load and both motors, whereby the load may be driven by either motor but at different speeds, a constant potential supply circuit, an electric motor connected thereto, two generators of different capacities driven thereby for supplying the two load-driving motors respectively, means for controlling the voltage delivered by said generators, and controlling means for the two motors arranged to operate said motors alternately for driving the load.

18. In combination with a load to be driven, two electric motors of different capacities, low-speed gearing between the smaller motor and the load, high-speed gearing between the larger motor and the load, a constant potential supply circuit, an electric motor connected thereto, two generators of different capacities driven by said motor for supplying the two load-driving motors respectively, means for controlling the voltage delivered by said generators, and controlling means for the two motors arranged to operate said motors alternately for driving the load, said gearing being arranged to give approximately the same load-speed with the smaller motor operating at maximum voltage and with the larger motor operating at minimum voltage.

In witness whereof, I have hereunto set my hand this 13th day of October, 1906.

WILBUR L. MERRILL.

Witnesses:
BENJAMIN B. HULL,
HELEN ORFORD.